(12) United States Patent
Lewis

(10) Patent No.: US 6,204,504 B1
(45) Date of Patent: Mar. 20, 2001

(54) METHOD FOR IMPROVING LUBRICATING SURFACES ON DISKS

(76) Inventor: Paul Lewis, 995 Cotton Tail Ave., San Jose, CA (US) 95116-3718

(*) Notice: Subject to any disclaimer, the term of this patent is extended or adjusted under 35 U.S.C. 154(b) by 0 days.

(21) Appl. No.: 09/591,450

(22) Filed: Jun. 12, 2000

Related U.S. Application Data

(62) Division of application No. 09/217,866, filed on Dec. 21, 1998, now Pat. No. 6,099,762.

(51) Int. Cl.[7] ............................ B05D 3/06; B05D 5/08
(52) U.S. Cl. ............ 250/365; 250/504 R; 250/495.1; 264/1.33; 264/492; 427/130; 427/131
(58) Field of Search ............... 250/365, 495.1, 250/504 R; 264/1.33, 492; 427/130, 131

(56) References Cited

U.S. PATENT DOCUMENTS

| | | | |
|---|---|---|---|
| 3,234,304 | 2/1966 | Nichols | 260/927 |
| 3,997,417 | 12/1976 | Marek et al. | 204/159.24 |
| 4,028,135 | 6/1977 | Vig et al. | 134/1 |
| 4,228,216 | 10/1980 | Austin et al. | 428/307 |
| 4,246,298 | 1/1981 | Guarnery et al. | 427/46 |
| 4,268,556 | 5/1981 | Pedrotty | 428/65 |
| 4,294,675 | 10/1981 | Matsuda et al. | 204/159.14 |
| 4,393,187 | 7/1983 | Boba et al. | 528/60 |
| 4,396,642 | 8/1983 | Bolt et al. | 427/54.1 |
| 4,490,870 | 1/1985 | Taub | 15/1.5 |
| 4,867,796 | 9/1989 | Asmus et al. | 131/1 |
| 4,871,416 | 10/1989 | Fukuda | 156/635 |
| 4,936,940 | 6/1990 | Kawasumi et al. | 156/345 |
| 5,024,968 | 6/1991 | Engelsberg | 437/173 |
| 5,030,478 * | 7/1991 | Lin et al. | 427/54.1 |
| 5,074,983 | 12/1991 | Eltoukhy et al. | 204/192 |
| 5,078,832 | 1/1992 | Tanaka | 156/639 |
| 5,102,924 | 4/1992 | Williams et al. | 522/4 |
| 5,151,135 | 9/1992 | Magee et al. | 134/1 |
| 5,178,682 | 1/1993 | Tsukamoto et al. | 118/722 |
| 5,221,423 | 6/1993 | Sugino et al. | 156/643 |
| 5,227,211 | 7/1993 | Eltoukhy et al. | 428/64 |
| 5,236,512 | 8/1993 | Rogers et al. | 134/1 |
| 5,326,406 | 7/1994 | Kaneko et al. | 134/1 |
| 5,336,531 | 8/1994 | Nakayama et al. | 427/510 |
| 5,352,327 | 10/1994 | Witowski | 156/646 |
| 5,480,492 | 1/1996 | Udagawa et al. | 134/2 |
| 5,482,561 | 1/1996 | Yeung et al. | 134/1 |
| 5,531,857 | 7/1996 | Engelsberg et al. | 156/345 |
| 5,562,965 | 10/1996 | Gui et al. | 428/65.4 |
| 5,580,614 | 12/1996 | Amberg-Schwab et al. | 427/493 |
| 5,587,217 | 12/1996 | Chao et al. | 428/65.4 |
| 5,656,096 | 8/1997 | Van Alstyne | 134/1 |
| 5,669,979 | 9/1997 | Elliot et al. | 134/1 |
| 5,741,577 * | 4/1998 | Yamamoto et al. | 428/212 |
| 6,096,385 * | 8/2000 | Yong et al. | 427/510 |

OTHER PUBLICATIONS

Advertising for "In–Line Oven Bonds Lubricant to Disks," p. 39, Jan. 1999, Data Storage, Despatch Industries.

* cited by examiner

*Primary Examiner*—Jack Berman
*Assistant Examiner*—Nikita Wells
(74) *Attorney, Agent, or Firm*—Fish & Richardson PC

(57) ABSTRACT

A method and apparatus are provided for improving the durability of lubricating layers on the surfaces of disks. The lubricating layers on the disks are exposed to ultraviolet and infrared radiation of sufficient duration and energy to reduce the total thickness of the layer but retain at least about 40% of the thickness of the remaining layer in bonded form. The useable lifetime of the lubricating surface is prolonged by treatment of the lubricating layer in this manner.

6 Claims, 3 Drawing Sheets

METHOD FOR IMPROVING LUBRICATING SURFACES ON DISKS

This is a divisional of U.S. application Ser. No. 09/217,866; filed Dec. 21, 1998, now U.S. Pat. No. 6,099,762.

The present invention relates to a method of improving the durability of the lubricating surface on magnetic thin film, oxide or magneto-optical disks.

BACKGROUND OF THE INVENTION

Thin film magnetic disks or media are widely used as data storage media for digital computers. Typically, the disks are formed by successively sputtering onto a rigid disk substrate an underlayer, a magnetic layer and a carbon overcoat which protects the magnetic layer against wear and reduces frictional forces between the disk and the read/write head.

It is also common to lubricate the disks with a thin film of a lubricant, which is typically a fluorocarbon, such as perfluoropolyether, or a phosphazene. This lubricant layer reduces frictional interaction between the head and the disk, particularly during start/stop cycles. Typical lubricants are commercial products such as AM2001 or Z-DOL, both of which are perfluoropolyether oils. The oils are applied with a solvent so the lubricating surface will also typically contain residues of the solvent which are typically a hydrofluoroether or a hydrofluoroalkane. The lubricants may be in separate sub-layers which form the outer lubricant layer or may be present as a mixture in a single layer. The types of disks which are typically in use are thin film magnetic disks, oxide coated disks, or magneto-optical disks, all of which are referred to here as thin film disks, or simply disks.

The lubricity of disks is generally measured by a dynamic or static coefficient of friction. The dynamic friction coefficient may be measured during contact of the read/write head with a disk determined at a constant spin rate, such as 1 RPM. The static coefficient of friction may be measured using a contact start/stop (CSF) test in which the peak level of friction is measured as the disk rotates from 0 to selected RPM, such as 5000 RPM. After peak friction is been measured, the disk is brought to rest and the start/stop process is repeated for a selected number of start/stop cycles. The long term disk and drive performance requires that the disk retain a relatively low coefficient of friction after many start/stop cycles or contacts with a read/write head.

The commonly employed lubricants used on magnetic media, particularly the perfluoropolyether class of lubricants, perform well under ambient conditions but not under conditions of higher temperature and high or low humidity. Therefore, typically it is necessary to use temperature and humidity control systems to avoid less favorable environmental conditions which would otherwise cause as rapid reduction in the disk performance.

SUMMARY OF THE INVENTION

In accordance with the present invention, a disk having an outer lubricating layer of substantially uniform thickness comprising a perflouropolyether, a phosphazene or both, as well as a fluorinated hydrocarbon solvent, is subjected to infrared and ultraviolet radiation. This reduces the thickness of the layer but is of sufficient duration and energy to bond at least about 40% of the thickness of the remaining lubricating layer to the disk. The bonded portion improves the durability of the lubricating layer.

An apparatus is also provided for bonding the lubricants to a disk comprising:

a chamber for exposing the disk to infrared and ultraviolet radiation;

a source of infrared radiation;

a source of ultraviolet radiation;

a transporter for introducing and withdrawing the disk from the chamber; and a gas-stream emitter for cooling the disk in a controlled manner upon withdrawal from the chamber.

The ultraviolet radiation comprises energy at wave length 1849 Angstroms to produce ozone.

The apparatus additionally may contain one or more ports for evacuating evolved gases from the chamber and a controller to operate the infrared and ultraviolet radiation independently from each other.

It is a further feature that the chamber may be insulated with a jacket internally cooled with air or liquid to maintain the temperature within the chamber.

The chamber is also preferably provided with at least one gas inlet and gas outlet for use in purging the interior of the chamber with nitrogen or other inert gas in order to avoid excess ozone accumulation within the chamber and evacuate evolved gases.

DESCRIPTION OF THE PREFERRED EMBODIMENTS

Figure 1:
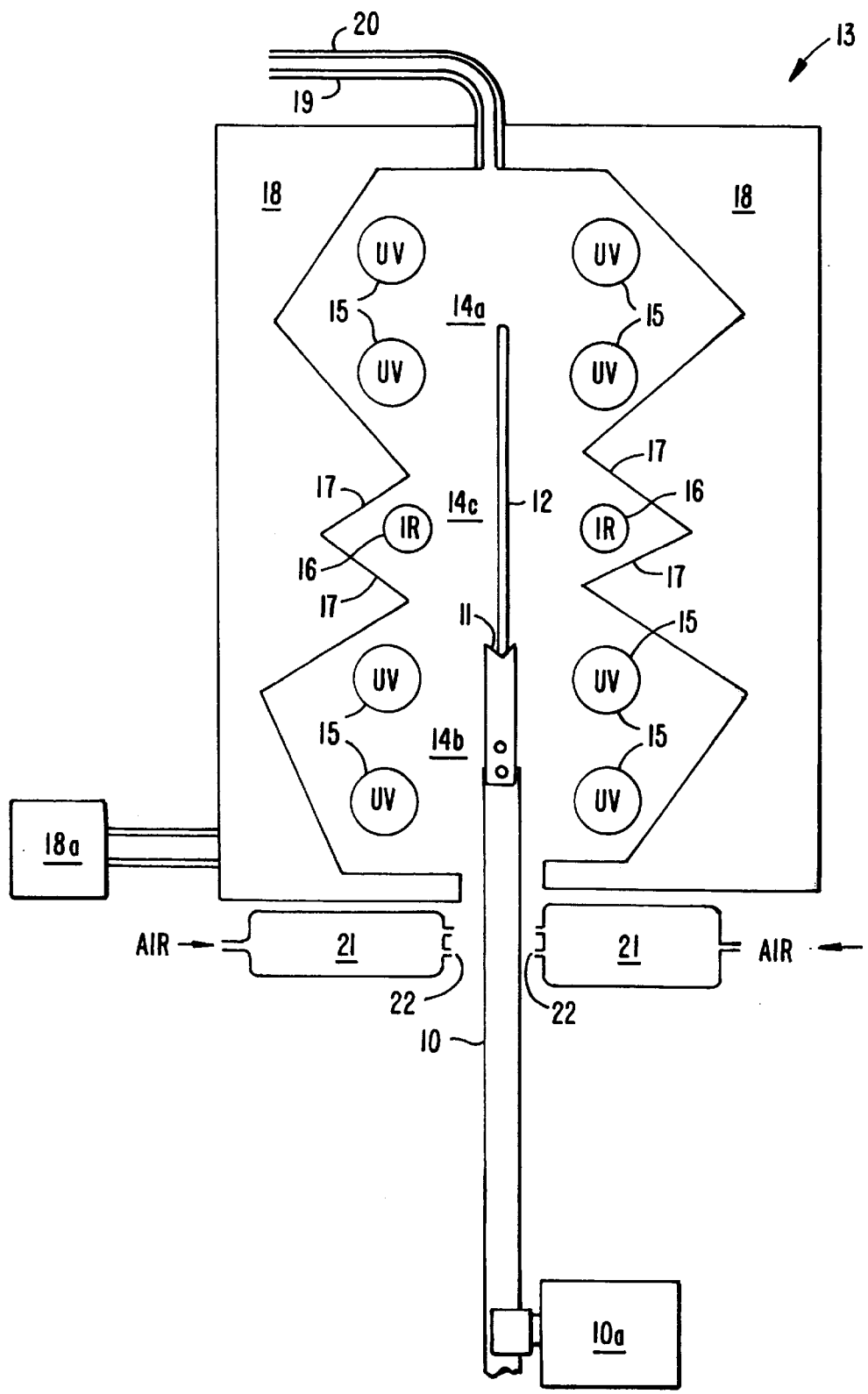
FIG. 1 is a schematic representation a cross-sectional view of an apparatus for treating disks with infrared and ultraviolet light according to the invention.

The present invention involves utilization of ultraviolet and infrared radiation to bond lubricating layers to a disk to improve the durability of the disk to read the write functions and stop/start trauma. The lubricating layer is submitted to infrared radiation of sufficient duration and energy to heat the layer to remove residual solvent without detrimentally affecting the function of the layer as a lubricating surface. The ultraviolet energy is provided comprising at least radiation of wavelength 1849 Angstroms, which in the presence of an oxygen containing atmosphere, produces ozone. While not intending to be bound by a particular theory, it is believed that the ozone reacts with the lubricating layer to bond a certain portion of it to the disk.

The terms lubricating layer or lubricating material as used herein include, but are not limited to, liquid perfluoropolyethers or phosphazenes such as those disclosed in U.S. Pat. Nos. 4,268,556 and 5,587,217, which are incorporated herein by reference in their entirety.

Prior to treatment with infrared and ultraviolet radiation, the untreated layer may also contain hydrofluoro ethers, such as methoxy-nonafluorobutane, or hydrofluoro alkanes, such as 2,3-dihydroperfluoropentane. These are subsequently removed from the layer when subjected to the radiation, primarily due to the temperature achieved on the surface of the disk by exposure to infrared radiation.

For a perfluoropolyether and phosphazene lubricant, the infrared radiation exposure should be of sufficient duration and energy to heat the disk to above about 150° F. but less than about 500° F. The disk is immediately cooled upon cessation of exposure to below about 100° F. to prevent damage to the disk.

The ultraviolet radiation is applied at a duration and energy sufficient to produce enough ozone to expose the disk during the exposure period to bond the lubricating layer.

This should include radiation in the wavelength range of 1800–4000 Angstroms, and specifically 1849 Angstroms, to produce ozone. Since the ultraviolet radiation does not substantially change the temperature of the lubricating layer, the duration of the exposure may be longer, typically up to about 60 seconds. The infrared and ultraviolet radiation may be concurrently or sequentially applied to the lubricating layer. The ultraviolet radiation should be applied close enough to the surface of the lubricating layer so that the ozone produced is not significantly quenched prior to contact to the lubricating surface. A convenient ultraviolet radiation source emitting UV energy between 10 and 400 microwatts/cm$^2$ (measured at 1 meter) will be sufficient if exposed to the lubricating layer up to about one minute at a distance of less than about 2 centimeters.

At least one of the wavelengths emitted by the ultraviolet source used must be short enough to be strongly absorbed by oxygen to generate ozone, that is, below 2,000 Angstroms. The 1849 Angstrom line is particularly important since it is absorbed by oxygen to generate ozone.

Infrared energy should be provided at an intensity, distance and energy from the surface of the disk such that for the given time of exposure, typically less than about 20 seconds, the temperature of the surface of the disk will rise to no greater than about 500° F. Raising of the temperature of the disk greater than this could cause physical damage to the disk and destroy the information storage capability of the disk.

The period of exposure to the infrared radiation should be short to facilitate rapid processing so exposure time is preferably less than about 20 seconds.

An additional benefit of exposure to ultraviolet radiation is the germicidal effect which is beneficial for storage, particularly where the disk will be exposed to humidity which is sufficient for bacterial or fungal growth. Germicidal ultraviolet wavelengths are from about 2000 to 3000 Angstroms. Typical incident energies at 2537 Angstroms of radiation required to inhibit colony formation in 90% of typical organisms is in the range of about 10,000 to 100,000 microwatt-seconds per square centimeter.

In operation of the method of the invention, a transporter typically will be a rack for inserting one or more disks into the chamber while accommodating the disk within the chamber in alignment for exposure to the ultraviolet and infrared radiation. Within the chamber, the ultraviolet and infrared sources of radiation will be directed to the surfaces of the disks for the requisite exposure periods. The radiation may be applied sequentially or simultaneously. If there is plurality of disks in the chamber, it is possible to treat the disks sequentially with the light, but it is preferred that all disks be treated simultaneously for speed of processing. Furthermore, the transporter will accommodate the disk such that both surfaces disk may be simultaneously exposed to the radiation so the chamber will contain at least two banks of radiation sources, one each for exposing opposite sides of the disk. Once the radiation sources are directed to the surfaces, the disk may be held stationary or may be scanned by moving the disk relative to the light sources within the chamber. A preferred method of operation is to apply the radiation as the disk is drawn into the chamber and to maintain the radiation as the disk is transported further into the chamber. As it is withdrawn from the chamber by the transporter, the infrared and/or ultraviolet sources of light may be turned off or blocked, if necessary, in order to achieve the correct period of exposure. Then as the disk exits the chamber, at or near the exit, a cooling device, such as a jetted manifold, is used to cool the disk with blasts of air in order to prevent damage to the disk and the memory information on the disk.

Referring now to FIG. 1, there is shown a schematic cross sectional diagram of a device 13 for exposing a disk according to the present invention. A transporter 10 having a groove 11 retains the disk 12 to be exposed in a vertical position. The transporter 10 is moved vertically into the device 13 by an appropriate motorized mechanism 10a. Within the device 13, there is a plurality of exposure zones 14a, 14b and 14c defining the inner chamber of the device 13. Zones 14a and 14b contain ultraviolet radiation sources 15 for exposing both sides of the disk 12 to ultraviolet light. The radiation in zone 14c contains infrared radiation sources 16 for irradiating both sides of the disk 12. The radiation sources 16 are accommodated within zone 14c such that surfaces 17 reflect infrared radiation onto the disk to avoid unnecessary heating of the ultraviolet sources 15 in the adjacent exposure zones. The zones 14a, 14b and 14c are surrounded by housing 18 containing a coolant liquid which is connected to a heat exchanger 18a to control the temperature within zones 14a, 14b and 14c. To further assist in the cooling of the zones 14a, 14b and 14c and to extract ozone or other gases emitted from the disk surfaces, gas purge inlet 19 and outlet 20 are provided at the top of zone 14a. Typically, inert gas such as nitrogen is used as a purge gas. The gases being removed are primarily ozone and residual organic solvents from the lubricating layers on the disk 12. The traversal speed of the transporter 10 is automatically controlled such that the total residence time of the disk 12 within device 13 provides the predetermined period of exposure to ultraviolet and infrared radiation. As the disk 12 is withdrawn from the device 13, manifold set 21 cools the disk by pressurized air through orifices 22. It will be readily seen that the device 13 may be controlled automatically to accommodate the predetermined exposure time and temperature of exposure of the disk 12. The temperature within the chamber may be controlled by controlling the liquid temperature within the housing 18 and the period of the exposure to the ultraviolet and infrared light may be controlled by the traversal time of the disk within the chamber as well as by turning the lamps 15 and 16 on and off, if appropriate.

Upon exiting the exposure chamber, the disk must be immediately cooled to halt the bonding process at the desired stage and to avoid potential damage to the other components of the disk. This is typically performed by a stream of ambient or cool air applied to both surfaces of the disk as it exits the exposure chamber. While not intending to be bound by a particular theory, the present invention achieves partial bonding of the initially fluid lubricating surface applied to the disk such that the bonded layer prolongs the lifetime of the lubrication layer during use, while maintaining the lubricity specification of the disk. Furthermore, extraneous solvent from the lubrication application process is removed by heating of the disk according to the invention.

Having described the invention, the following examples are provided by way of illustration of the invention but are not intended to limit the invention in any manner.

EXAMPLE 1

Twenty five disks having a "Z DOL™" (Ausimont U.S.A., Inc.) lubricating layer were tested as follows. The lubricant is a perfluoropolyether oil containing a dihydroxy derivative of a perfluoropolyoxyalkane.

A chamber containing two 1,000 watt medium weight infrared lamps and eight ultraviolet lamps in configuration shown in FIG. 1 was used to expose both sides of the disks. The disks were approximately 0.031 inches thick and the center distance from each lamp to the disk center was approximately 0.625 inches. Each of the disks was cycled through the chamber, having the total exposure time to infrared and ultraviolet as shown below in Table 1. The maximum temperature achieved during exposure is also in Table 1.

TABLE 1

| DISK # | SURFACE TEMP. ° F. | IR Exposure (sec.) | UV Exposure (sec.) |
|---|---|---|---|
| 1 (control) | AMBIENT | 0 | 0 |
| 2 | 148 | 4 | 6 |
| 3 | 168 | 5 | 7 |
| 4 | 240 | 6 | 8 |
| 5 | 275 | 7 | 9 |
| 6 | 300 | 8 | 10 |
| 7 | 355 | 9 | 11 |
| 8 | 385 | 10 | 12 |
| 9 | 428 | 11 | 13 |
| 10 | 466 | 12 | 14 |
| 11 | 482 | 13 | 15 |
| 12 | 500+ | 14 | 16 |
| 13 | 500+ | 15 | 17 |
| 14 | 500+ | 15 | 45 |
| 15 | 500+ | 14 | 45 |
| 16 | 482 | 13 | 45 |
| 17 | 466 | 12 | 45 |
| 18 | 428 | 11 | 45 |
| 19 | 385 | 10 | 45 |
| 20 | 355 | 9 | 45 |
| 21 | 300 | 8 | 45 |
| 22 | 275 | 7 | 45 |
| 23 | 240 | 6 | 45 |
| 24 | 168 | 5 | 45 |
| 25 | 148 | 4 | 45 |

Figure 2:
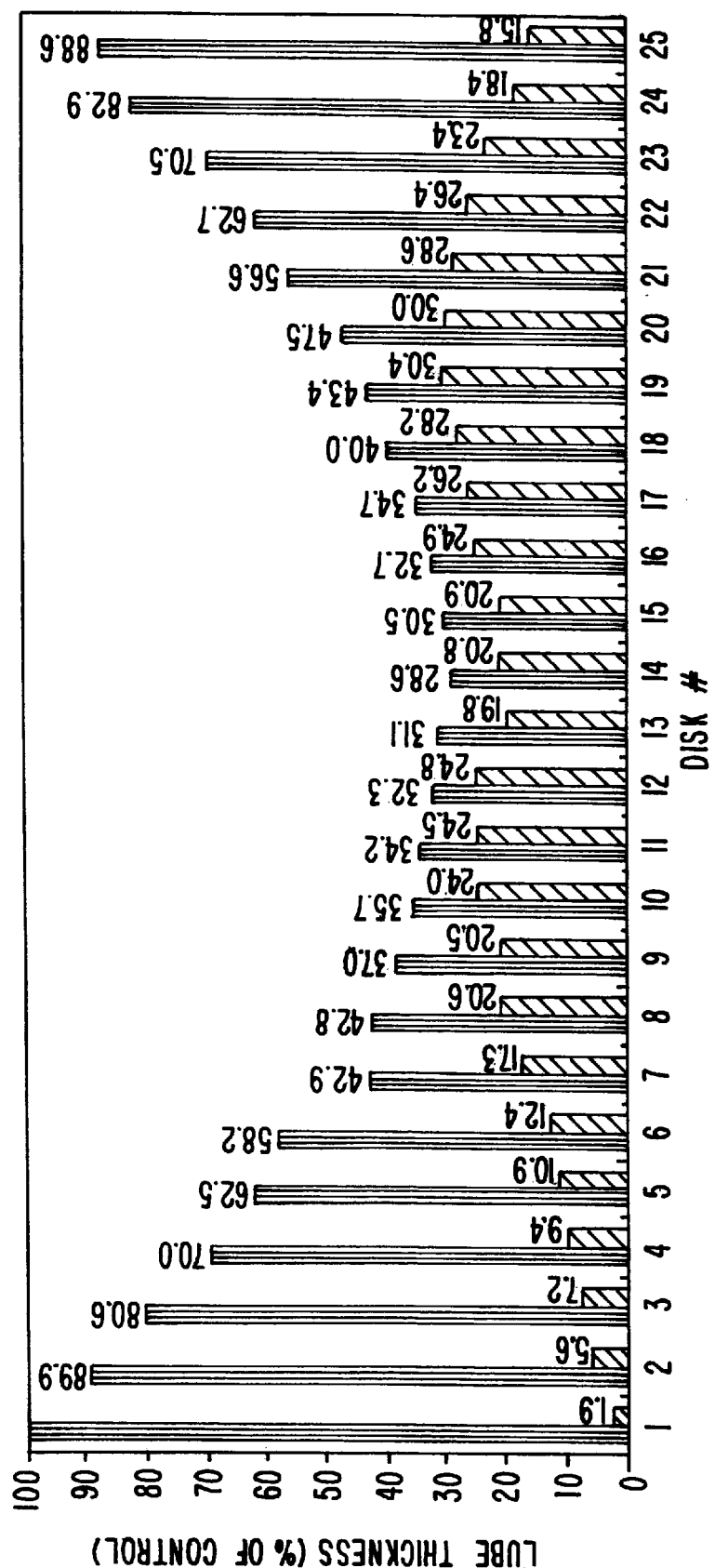
FIGS. 2 and 3 are graphs illustrating the test results showing thickness of bonded layers after treatment of disks according to the invention.

Referring to FIG. 2, the abscissa indicates the disk number. The ordinate at each disk indicates two bars, the one on the left being the total lubrication thickness remaining on the disk after exposure and the bar on the right being the thickness that is bonded subsequent to the treatment with radiation. The thickness is given as percentage of the control disk thickness on Disk 1.

The maximum thicknesses of bonded layers are achieved at disks 10–12 and at the disk 18–21. For disks 2–13, the periods of exposure of both infrared and ultraviolet radiation were increased from 4 seconds to 15 seconds of infrared radiation and from 6 to 17 seconds of ultraviolet radiation. Under those conditions, the thickest bonded layers were achieved on disks exposed from 12–14 seconds of infrared and 1414 16 seconds of ultraviolet radiation. On disks 7–13, the bonded layer thickness exceeded 40% of the thickness of the layer remaining after exposure.

In disks 14–25, the ultraviolet radiation exposure time was held constant at 45 seconds and the infrared exposure time was varied from 15 to 4 seconds. Under those conditions, the thickest bonded layers were found in disks 18–21 where the infrared radiation exposure time was from 11 to 8 seconds. On disks 14–22, the bonded layer thickness exceeded 40% of the thickness of the layer remaining after exposure. Disk 1 was the control in which the disk containing the fluid lubricant was not exposed to ultraviolet or infrared radiation and therefore retained the entire thickness of the fluid lubrication layer. To measure how much was bonded to the disk, the layers were washed with solvent and the thickness measured again. Upon exposure to the radiation, the total thicknesses of the layers decrease with increasing exposure to infrared radiation, in part due to evaporation. However, increase in the time of the exposure to ultraviolet radiation does not correlate in that manner. Therefore, there is an unexpected result achieved in the combination of the exposure times to achieve the thickest bonded layer.

EXAMPLE 2

Figure 3:
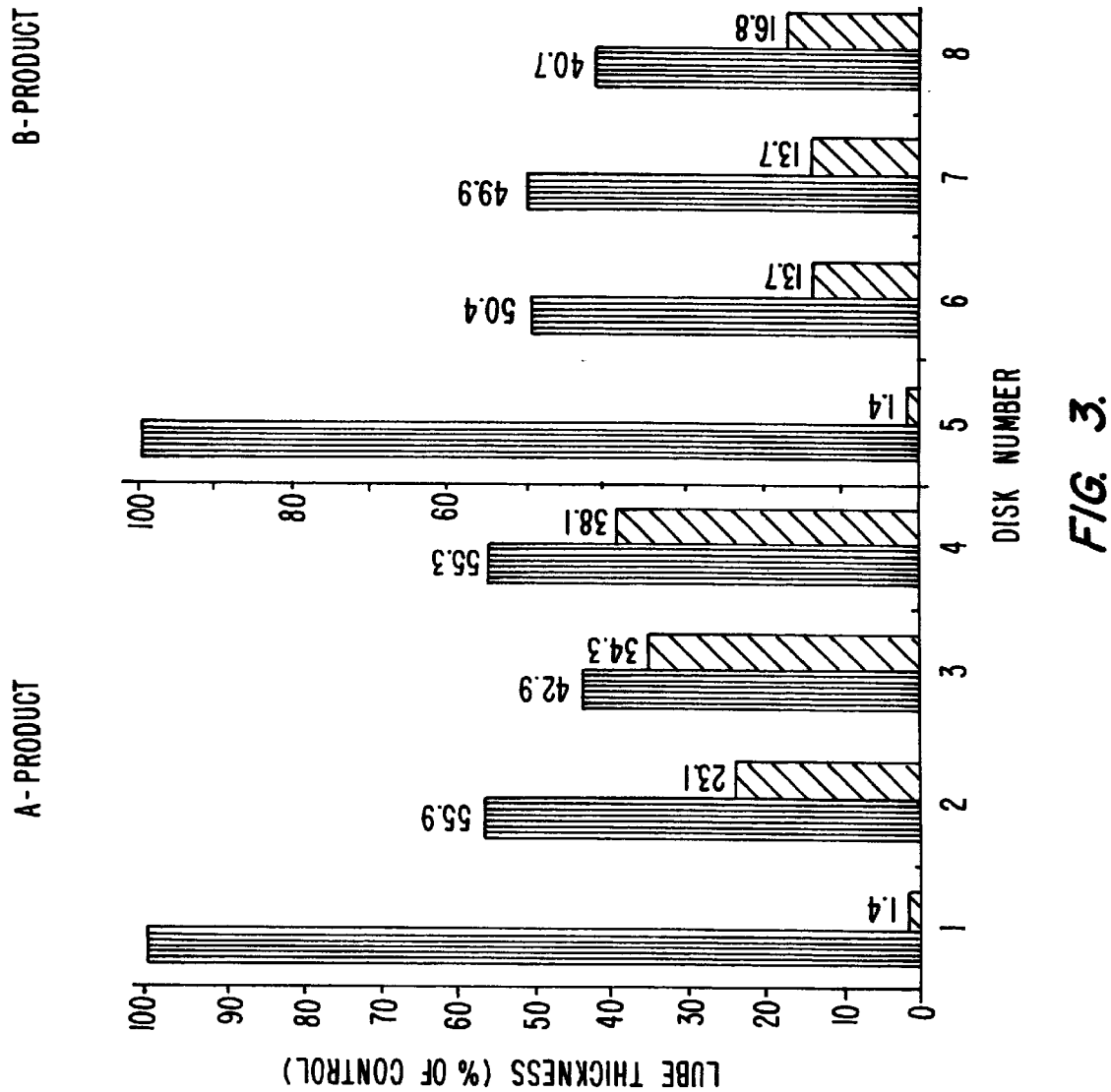

Referring to FIG. 3, there is shown a similar test conducted on two differently lubricated disks. The first product is identified as the "A" product and the results are shown in samples 1–4. The second product is the "B" product and the test samples are 5–8. The exposure time to infrared ultraviolet radiation are shown below in Table 2. The lubricating layers both products contain "Z DOL" (Ausimont U.S.A., Inc.). On disks 2–4 and 8, the bonded layer thickness exceeded 40% of the layer remaining after exposure.

TABLE 2

| DISK # | IR Exposure (sec.) | UV Exposure (sec.) |
|---|---|---|
| 1 (control) | 0 | 0 |
| 2 | 8 | 10 |
| 3 | 10 | 12 |
| 4 | 8 | 45 |
| 5 (control) | 0 | 0 |
| 6 | 8 | 12 |
| 7 | 8 | 12 |
| 8 | 10 | 12 |

The invention being thus described, will be obvious that it may be varied in many ways and such variations are not to be regarded as a departure from the scope of the invention.

What is claimed is:

1. An apparatus for bonding a lubricant to a thin film disk comprising:

a chamber for exposure of said disk to infrared and ultraviolet radiation;

a source of infrared radiation;

a source of ultraviolet radiation;

a transporter for introducing and withdrawing said disk from said chamber;

a gas stream emitter for cooling said disk as said disk is withdrawn from said chamber.

2. The apparatus according to claim 1 further comprising a port for evacuating gases from said chamber evolved from said exposure of said disk to said radiation.

3. An apparatus according to claim 1 wherein said source of ultraviolet radiation comprises energy at the wavelength of 1849 Angstroms.

4. An apparatus according to claim 1 further comprising a controller to operate said infrared and ultraviolet radiation independently from each other.

5. An apparatus according to claim 1 wherein said gas stream emitter comprises a manifold accommodating a plurality of orifices directed at said surface.

6. An apparatus according to claim 1 further comprising a cooling jacket surrounding said chamber for controlling the temperature within said chamber.

* * * * *